(12) United States Patent
Blake et al.

(10) Patent No.: US 9,512,024 B2
(45) Date of Patent: Dec. 6, 2016

(54) SYSTEM AND PROCESS FOR THE DISINFECTION OF SLUDGE OR SOLIDS

(71) Applicants: Alexander Blake, Holmdel, NJ (US);
Hilary Boehme, St. James, NY (US);
Barbara Blake, Holmdel, NJ (US);
Glen A. Menture, Keansburg, NJ (US);
Jeffrey Goldberg, Manalapan, NJ (US);
Andrea Monick, Holmdel, NJ (US)

(72) Inventors: Alexander Blake, Holmdel, NJ (US);
Hilary Boehme, St. James, NY (US);
Barbara Blake, Holmdel, NJ (US);
Glen A. Menture, Keansburg, NJ (US);
Jeffrey Goldberg, Manalapan, NJ (US);
Andrea Monick, Holmdel, NJ (US)

( * ) Notice: Subject to any disclaimer, the term of this patent is extended or adjusted under 35 U.S.C. 154(b) by 182 days.

(21) Appl. No.: 13/986,628

(22) Filed: May 20, 2013

(65) Prior Publication Data

US 2014/0341778 A1    Nov. 20, 2014

(51) Int. Cl.
*C02F 11/06* (2006.01)
*C02F 11/00* (2006.01)
*C05F 7/00* (2006.01)

(52) U.S. Cl.
CPC .............. *C02F 11/004* (2013.01); *C05F 7/00* (2013.01); *C02F 11/00* (2013.01); *C02F 2201/784* (2013.01)

(58) Field of Classification Search
CPC ...... C02F 11/004; C02F 11/06; C02F 2303/04
See application file for complete search history.

(56) References Cited

U.S. PATENT DOCUMENTS

| | | | | |
|---|---|---|---|---|
| 3,975,247 A | * | 8/1976 | Stralser | 205/701 |
| 5,942,125 A | * | 8/1999 | Engelhard | A61C 1/0076 210/192 |
| 2005/0129571 A1 | * | 6/2005 | Centanni | 422/31 |
| 2006/0169646 A1 | * | 8/2006 | Andree et al. | 210/739 |
| 2008/0000844 A1 | * | 1/2008 | Ralph | 210/760 |

\* cited by examiner

*Primary Examiner* — Sean E Conley
*Assistant Examiner* — Donald Spamer

(57) ABSTRACT

A system and process are provided for the disinfection of sewage sludge or solids without the addition of chemicals such as chlorine etc. or/and reverse osmosis. The treated sludge or solids can be deposited on landfills or used as fertilizer.

1 Claim, 4 Drawing Sheets

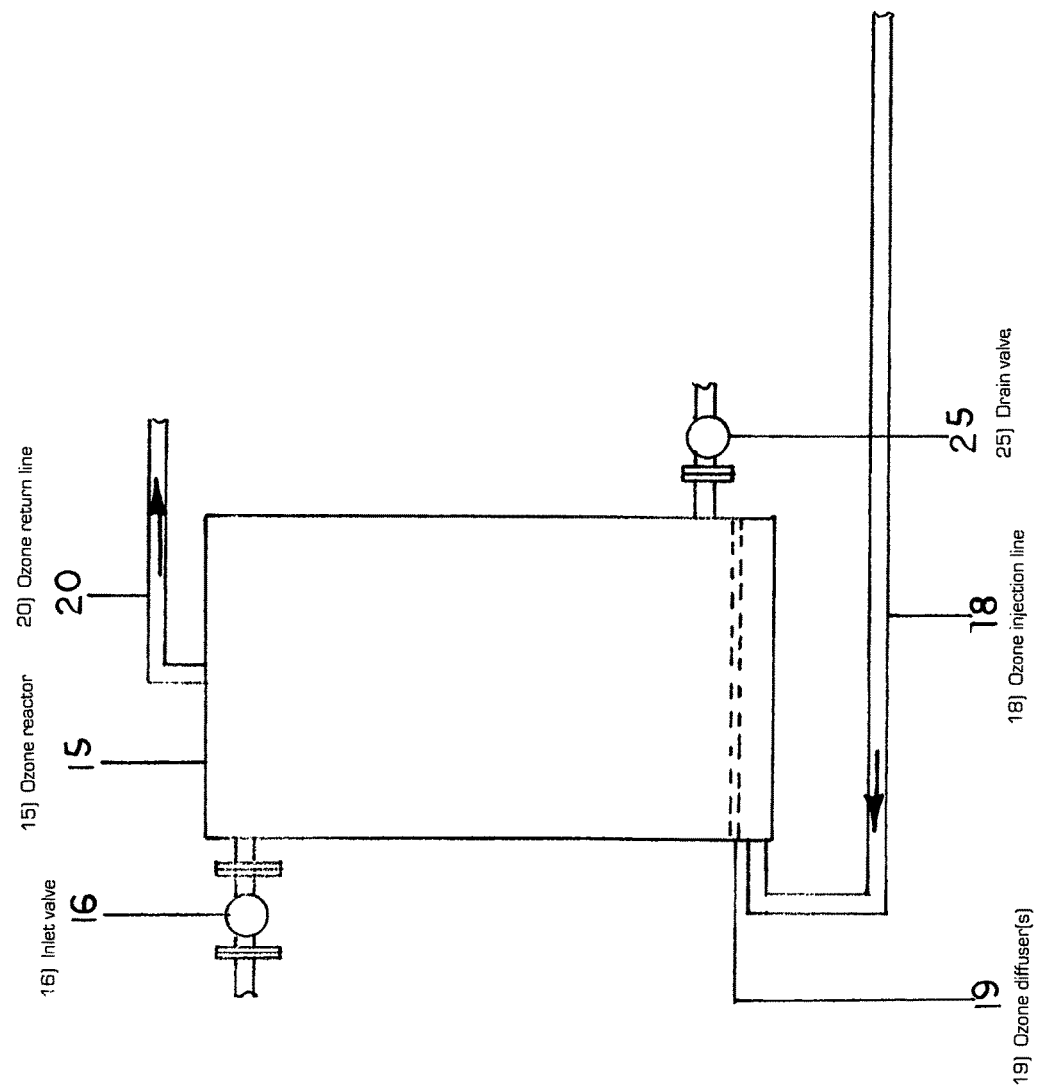

SYSTEM AND PROCESS FOR THE DISINFECTION OF SLUDGE OR SOLIDS

BACKGROUND OF THE INVENTION

Presently sludge or solids of sewage or other sources contaminated with viruses, bacteria, parasites or fungi are treated with high doses of chlorine and require considerable treatment time. The present invention includes a decoagulation process and an ozone disinfection process requiring no chemical addition.

The disinfection of sewage sludge or solids is a worldwide problem and difficult problem to control, but is solved with the present invention. The process of the present invention is applicable to any volume of sludge or solids and can be applied as adjunct to any sewage treatment process.

After treatment in the system of the present invention, the disinfected sludge or solids can usually be deposited on landfills or used as fertilizer on farmland.

SUMMARY OF THE INVENTION

The present invention provides an effective disinfection of sewage sludge or solids without the addition of chemicals or the use of membranes or reverses osmosis.

Specifically, the present invention consists of a dilution and decoagulation vessel and process. The sludge or solids are entered into the dilution and decoagulation vessel and is diluted with 8 or 10 parts of water to 1 part of sludge or solids. The dilution ratio is determined in pilot tests and may require less or slightly more addition of water. A decoagulation agent is then added, if required, to suspend the sludge or solids. The mixture is then vigorously agitated for 1 to 3 minutes, depending on the types of sludge or solids. The agitation time is also determined in a pilot test to be performed in each case.

Upon completion of the dilution and decoagulation phase, the waste is transferred to the ozone treatment vessel. The ozone is added to the waste for a period to be determined in a pilot test and may range from 1 to 4 hours retention time. When the ozone treatment is completed, the waste is discharged from the ozone treatment vessel and the sludge or solids are separated for deposit. The water can be stored in a separate holding tank for reuse as dilution water in the following dilution and decoagulation processes thereby reducing the requirement of fresh water.

The number of required dilution and decoagulation vessels and ozone treatment vessels depends on the sludge or solids volume and retention time required for treatment, which is determined in pilot tests.

Figure 1:
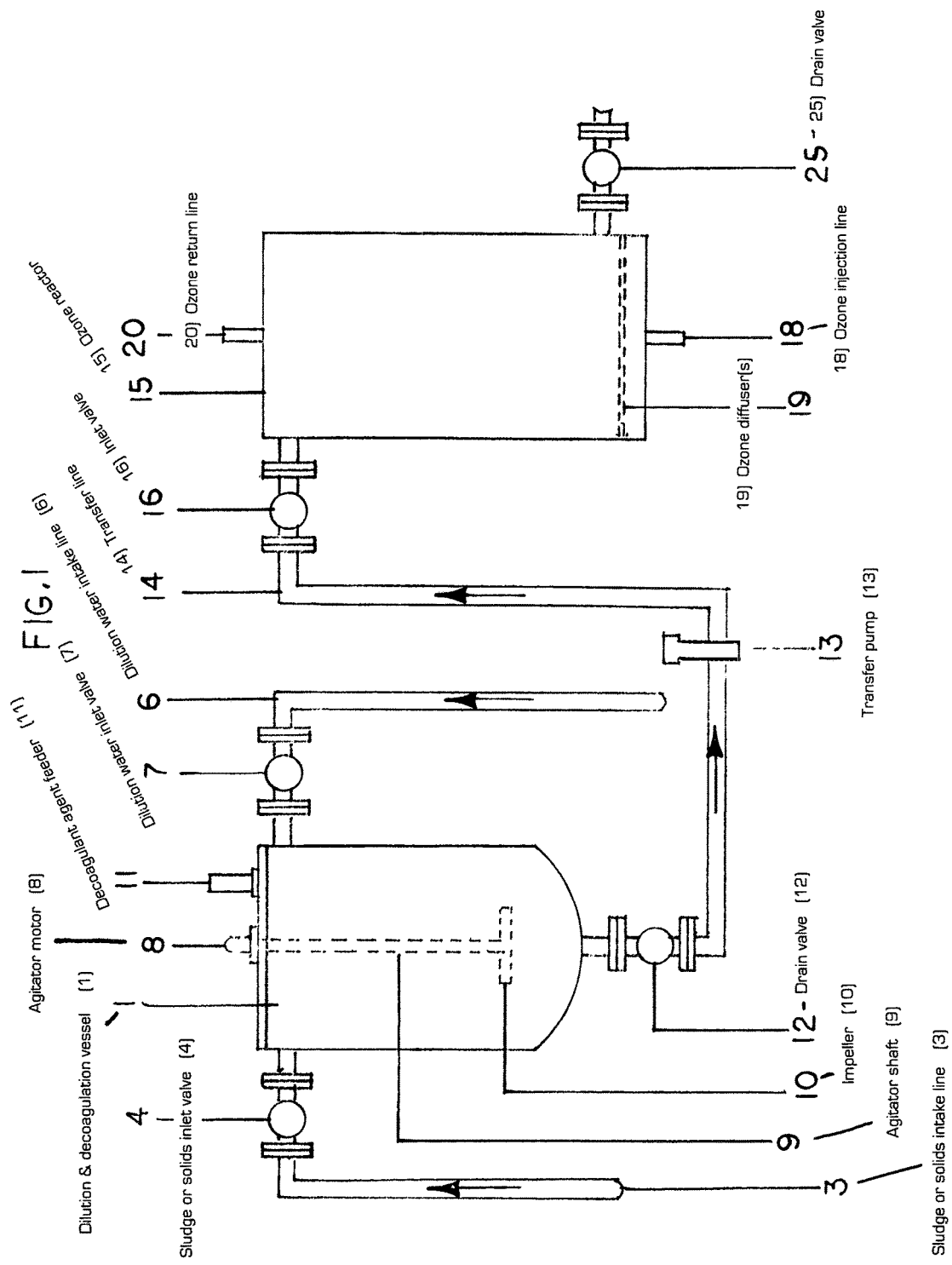
Figure 2:
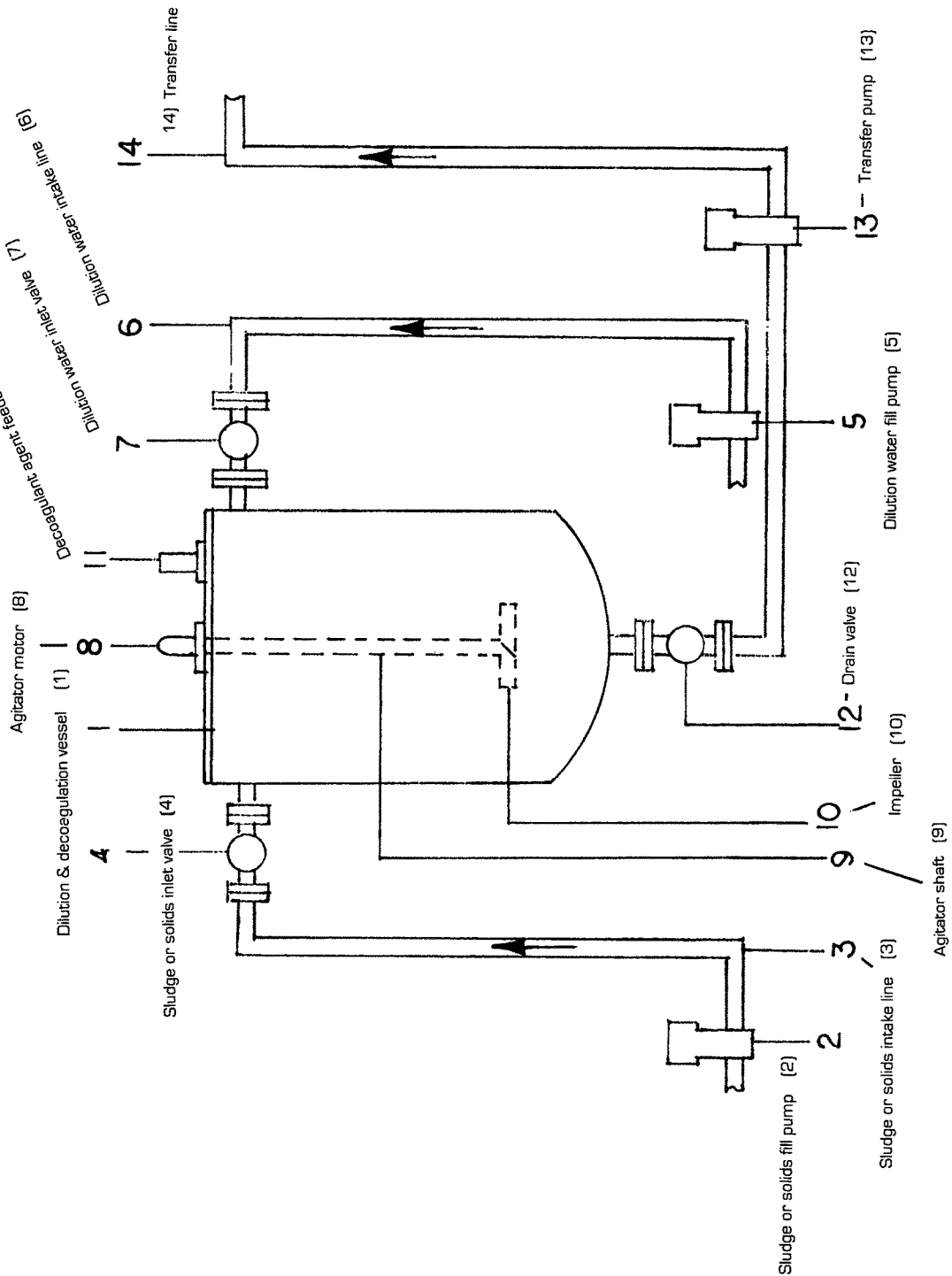
Figure 3:
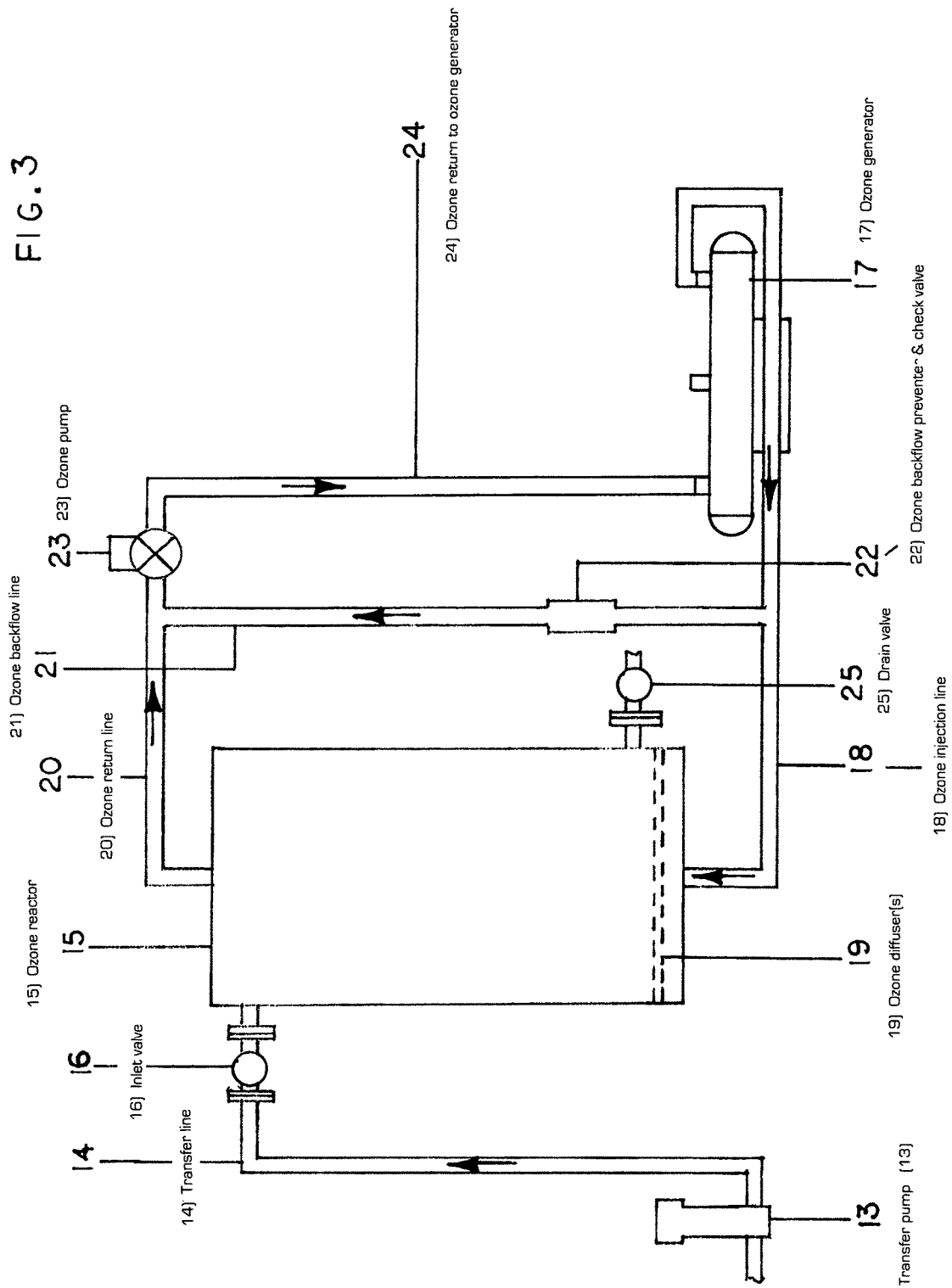

FIG. 1
1. Dilution and decoagulation vessel
3. Sludge or solids intake line
4. Sludge or solids inlet valve
6. Dilution water intake line
7. Dilution water inlet valve
8. Agitator motor
9. Agitator shaft
10. Impeller
11. Decoagulant agent feeder
12. Drain Valve
13. Transfer Pump
14. Transfer line
15. Ozone reactor
16. Inlet valve
18. Ozone injection line
19. Ozone diffuser or diffusers
20. Ozone return line
25. Drain valve FIG. 2
1. Dilution and decoagulation vessel
2. Sludge or solids fill pump
3. Sludge or solids intake line
4. Sludge or solids inlet valve
5. Dilution water fill pump
6. Dilution water intake line
7. Dilution water inlet valve
8. Agitator motor
9. Agitator shaft
10. Impeller
11. Decoagulant agent feeder
12. Drain valve
13. Transfer pump
14. Transfer line FIG. 3
13. Transfer pump
14. Transfer line
15. Ozone reactor
16. Inlet valve
17. Ozone generator
18. Ozone injection line
19. Ozone diffuser or diffusers
20. Ozone return line
21. Ozone backflow line
22. Ozone backflow preventer and check valve
23. Ozone pump
24. Ozone return line to ozone generator
25. Drain valve FIG. 4
15. Ozone reactor
16. Inlet valve
18. Ozone injection line
19. Ozone diffuser or diffusers
20. Ozone return line

DESCRIPTION OF THE PREFERRED EMBODIMENTS

The sludge or solids are pumped by sludge or solids fill pump 2 through sludge or solids intake line 3 into dilution and decoagulation vessel 1. The dilution water is added by the dilution water fill pump 5 through dilution water intake line 6 into dilution and decoagulation vessel 1. A decoagulation agent is then entered into the dilution and decoagulation vessel 1 from decoagulation agent feeder 11. The diluted waste is then vigorously agitated for a predetermined period of time, which is 1 to 3 minutes, by agitator motor 8, agitator shaft 9 and impeller 10. Depending on the size of solids, a grinder pump (not illustrated) may be employed upstream of sludge or solids fill pump 2. A second impeller, 3' or 4' above the bottom impeller 10 may be installed.

Upon completion of the dilution and decoagulation phase the diluted waste is drained through drain valve 12 and transferred by transfer pump 13 through transfer line 14 and valve 16 into the ozone treatment vessel 15. The retention time, during which ozone is constantly injected, is 1 to 4 hours. The length of the retention and ozone treatment phase is predetermined in pilot tests.

The ozone is generated by ozone generator 17 and flows through ozone injection line 18, which may also be on side as illustrated in FIG. 4, through ozone diffuser or diffusers 19 into the waste. The ozone then flows through the waste. As the ozone bubbles rise to the top and above the waste, the ozone flows through ozone return line 20 to ozone pump 25 and is pumped through ozone return line 24 to ozone generator 17. Ozone pump 23 also provides the pressure to ozone generator 17 to force the ozone through ozone injection line 18 and diffuser 19 to ozone reactor 15. Ozone backflow line 21 and ozone backflow preventer and check valve 22 allow the regulation of the ozone injection into ozone treatment vessel 15. The excess of ozone is returned through ozone return line 20 to ozone pump 23 and returned through line 24 to the ozone generator 17. The process eliminates escape of ozone into the atmosphere by returning used ozone to ozone generator 17, thereby creating a closed loop. The treated waste is discharged through valve 25.

The discharged waste can be filtered and separated. It is desirable to transfer the separated water to a holding vessel to be used in following cycles for dilution water, thus keeping the required fresh water to a minimum. The separated sludge or solids can be deposited on landfills or used as fertilizer.

The system can be designed in different vessel sizes or multiple dilution and decoagulation vessels 1 and ozone treatment vessel 15 to accommodate any volume of sludge or solids.

Not being bound by theory, it is to be understood that not all components may be required, and that the system and process of the present invention may be applicable to the treatment of other infected sludge or solids, not only those generated by sewage.

TABLE 1

| Parameter | Treatment time | Concentration MPN/10 g |
| --- | --- | --- |
| Fecal Coliform | untreated | >16000 |
| Total Coliform | untreated | >16000 |

TABLE 2

| Parameter | Treatment time (hours) | Concentration MPN/10 g |
| --- | --- | --- |
| Total Coliform | 2 | 27 |

TABLE 3

| Parameter | Treatment time (hours) | Concentration MPN/10 g |
| --- | --- | --- |
| Total Coliform | 3 | 2 |

What is claimed is:

1. An apparatus for sterilizing and disinfecting sludge or solid waste from sewage or other biologically contaminated waste comprising:
    a dilution and decoagulation vessel wherein the dilution and decoagulation vessel comprises
        a top wall,
        a side wall,
            a bottom wall,
            a first inlet for inputting the sludge or solids,
            a second inlet for inputting dilution water,
            a decoagulation agent feeder;
    and an outlet for outputting a mixture of the sludge or solids, decoagulation agent, and dilution water;
    an agitator comprising a motor, a shaft, and an impeller wherein the shaft and the impeller are located within a chamber formed by the top wall, the sidewall, and the bottom wall;
    an ozone treatment vessel;
    a transfer system consisting of
        a first valve located at the outlet of the dilution and decoagulation vessel,
        a transfer conduit,
        a second valve located at an inlet to the ozone treatment vessel,
        and a transfer pump located along the transfer conduit,
        wherein the transfer system transfers the mixture directly from the dilution and decoagulation vessel to the ozone treatment vessel;
    an ozone treatment system comprising
        an ozone generator,
        an ozone supply line which supplies ozone from the generator to the ozone treatment vessel,
        one or more diffusers connected to the ozone supply line for introducing the ozone into the mixture,
        an ozone return conduit which removes excess ozone from the ozone treatment vessel and feeds the excess ozone back to the ozone generator, and
        an ozone treatment vessel bypass including a check valve that connects the ozone supply line directly to the ozone return conduit; and
    a treated waste discharge outlet for discharging a sterilized and disinfected waste.

* * * * *